3,500,132
ELECTRIC CIRCUIT FOR TRANSMISSION OF
POWER AND INFORMATION BY COMMON
LINES
Sheyrl W. Garrett, Tulsa, Okla., assignor to Combustion
Engineering Inc., New York, N.Y., a corporation of
Delaware
Filed Dec. 19, 1966, Ser. No. 602,971
Int. Cl. H01h 47/00
U.S. Cl. 317—123                                      4 Claims

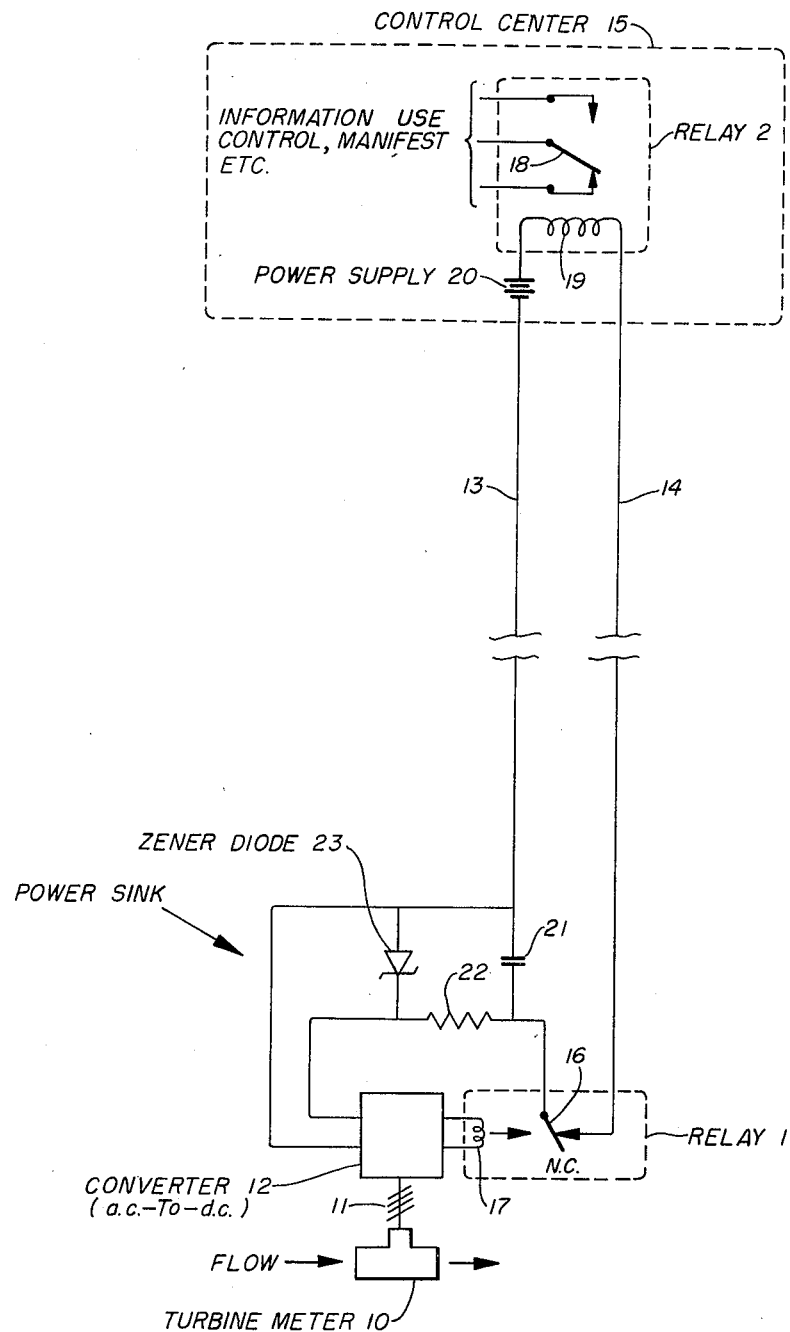

ABSTRACT OF THE DISCLOSURE

A turbine meter with an electro-magnetic transducer, as a source of relatively low A.C. signal, is connected to an A.C.-to-D.C. converter. A power source at a control center is connected to the converter over lines which are disconnected from the converter for transmission of the converter output to the center.

BACKGROUND OF THE INVENTION

Field of the invention

This invention relates to the transmission of electric power and information by the same pair of lines.

Description of the prior art

The output electrical signals of some primary elements are of such low order that they cannot be transmitted any distance without distortion. Even the expense of a shielded cable will not solve the problem.

One approach to the problem is to convert the electrical signals of the primary element to D.C. voltage pulses which can be transmitted great distances by a single pair of lines. An A.C.-to-D.C. converter can be placed at the primary element. However, the problem then arises as to how to supply basic power to the converter. The pair of lines between the converter-primary element and control center is expensive. If this single pair of lines can be used for both power from the center to the converter and transmission of the D.C. signal to the control center a number of primary elements can be served power while collecting their information at the center for whatever action is desired.

SUMMARY OF THE INVENTION

It is an object of the invention to provide a power storage at an A.C.-to-D.C. converter which will regulate power to the converter for an information transmission interval, the remaining time being connected to the power source at the control center by the same pair of wires transmitting information.

To carry out the first object, the invention contemplates a capacitor at the converter, the power flowing from this "sink" under the regulation of a Zener diode, or equivalent structure. Normally, the combination of capacitor and Zener diode is connected to the control center power by the two lines and disconnected only during the interval of information transmission.

The invention also comprises novel details of construction and novel combinations and arrangements of parts, which will more fully appear in the course of the following description. The drawing merely shows, and the description merely describes, the preferred embodiment of the present invention which is given by way of illustration or example.

BRIEF DESCRIPTION OF THE DRAWING

A schematic view of a circuit including a single pair of transmission lines for power and information, and including the present invention.

DESCRIPTION OF THE PREFERRED EMBODIMENT

In the drawing a source of relatively weak, primary element, signal is embodied in turbine meter 10. Meter 10 responds to flow of fluids through its body and senses the rotation of its rotor blades with an electro-magnetic transducer. The relatively low order of A.C. voltage pulses from the meter transducer are transmitted by cable 11 to converter 12.

The internal circuit of A.C.-to-D.C. converter 12 is not important in this disclosure beyond the fact that it requires a low order of electrical power to generate a D.C. voltage pulse output from the turbine meter input. The present invention supplies the power required during the interval when the output relay of the converter is transmitting information over lines 13, 14.

Lines 13, 14 connect the transmitting equipment on their one end to the control center 15 on the other. It is not the intention of the disclosure to over-simplify the structure at either end of lines 13, 14. However, for the purpose of disclosing the invention, only the elements of Relay 1 and Relay 2 are disclosed in any detail.

Relay 1 comprises a switch 16 which is actuated from its normally closed position disclosed by solenoid coil 17 of converter 12. Relay 2 comprises a switch 18 which is actuated between two alternate positions by solenoid coil 19.

Coil 19 is energized by power supply 20 when switch 16 is in its normally closed position shown. Capacitor 21 and converter 12 are connected in parallel with supply 20 and capacitor 21 is charged during the time that switch 16 is normally closed as disclosed. When switch 16 opens, capacitor 20 remains as the only source of voltage available to converter 12. The capacitor 20, as a source of voltage for converter 12, is regulated by the combination of resistance 22 and Zener diode 23 to maintain converter 12 operative during the period of time switch 16 is open.

In operation, the information transmission begins with converter 12 energizing Relay 1 when a predetermined number of pulses from the turbine meter have accumulated. The loop including lines 13, 14 is opened by Relay 1 and Relay 2 is thereby de-energized. The power sink then takes over to keep converter 12 energized. In the position of Relay 2 alternate to that disclosed, the control, manifestation equipment, etc., is actuated each time the predetermined number of pulses from the turbine meter accumulate.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An electric transmission circuit, including,
   a primary element generating a relatively weak A.C. voltage representative of a condition,
   a converter connected to the primary element to receive the A.C. voltage and generate a D.C. voltage proportional to the A.C. voltage, a first switch connected to the converter and actuated from its normally closed position by the D.C. voltage, an operating means for a second switch connected in a power loop with the first switch and actuating the second switch to one of its alternate positions when the power loop is broken at the first switch, a connection between the power loop and the converter to energize the converter when the first switch is closed, and a power sink connected to the power loop and the converter to maintain the converter energized during the interval the first switch is open.

2. The circuit of claim 1 in which the first switch and converter and power sink are located close to the primary element and the operating means for the second switch and power for the loop are located at a remote control center for actuation of control and manifestation equipment and the like.

3. An electric transmission circuit, including, a primary element generating A.C. voltage pulses representative of a condition, an A.C.-to-D.C. converter connected to the primary element to produce a D.C. voltage representative of the condition, an electrical power supply located at a remote distance from the converter, a first relay coil connected to the power supply to manifest the condition by actuation of a switch to one of its alternate positions, a second relay coil connected to the converter to actuate a switch to one of its alternate positions by the D.C. voltage output of the converter.

a power sink connected to the converter as a power supply for the converter, a circuit connecting the switch of the second relay coil and the first relay coil and the remote power supply and the power sink in a power loop, whereby actuation of the second relay switch alternately completes the circuit between the power supply and the sink and breaks the circuit to leave the power sink connected to the converter, the interval during which the circuit is broken representing a condition at the primary element which is transmitted to the first relay and switch.

4. The circuit of claim 3 wherein the power sink is a resistance and Zener diode combination in the output of a capacitor.

References Cited

UNITED STATES PATENTS 3,351,934  11/1967  Vietz _____ 340—409

LEE T. HIX, Primary Examiner

C. L. YATES, Assistant Examiner

U.S. Cl. X.R.

317—137, 157; 320—2, 5; 340—239, 310